(12) United States Patent
Fukuoh

(10) Patent No.: US 9,274,697 B2
(45) Date of Patent: Mar. 1, 2016

(54) INFORMATION PROCESSING APPARATUS, INFORMATION PROCESSING METHOD AND TANGIBLE COMPUTER-READABLE RECORDING MEDIUM

(71) Applicant: Konica Minolta, Inc., Tokyo (JP)

(72) Inventor: Chohiko Fukuoh, Tokyo (JP)

(73) Assignee: KONICA MINOLTA, INC. (JP)

( * ) Notice: Subject to any disclaimer, the term of this patent is extended or adjusted under 35 U.S.C. 154(b) by 149 days.

(21) Appl. No.: 13/866,991

(22) Filed: Apr. 19, 2013

(65) Prior Publication Data

US 2013/0278523 A1    Oct. 24, 2013

(30) Foreign Application Priority Data

Apr. 24, 2012    (JP) .................................. 2012-99262

(51) Int. Cl.
| | | |
|---|---|---|
| *G06F 3/041* | (2006.01) | |
| *G06F 3/0487* | (2013.01) | |
| *G06F 3/0485* | (2013.01) | |
| *G06F 3/0488* | (2013.01) | |

(52) U.S. Cl.
CPC ............ *G06F 3/0487* (2013.01); *G06F 3/0412* (2013.01); *G06F 3/04855* (2013.01); *G06F 3/04883* (2013.01); *G06F 3/04886* (2013.01)

(58) Field of Classification Search
CPC ........... G06F 3/042; G06F 3/02; G06F 3/041; G06F 3/045; G09G 5/00
USPC .................... 345/173–176; 178/18.01–18.06; 715/700, 764, 781, 784
See application file for complete search history.

(56) References Cited

U.S. PATENT DOCUMENTS

| | | | |
|---|---|---|---|
| 2006/0038796 A1* | 2/2006 | Hinckley et al. ............... | 345/173 |
| 2006/0059436 A1* | 3/2006 | Nurmi ............................ | 715/786 |
| 2009/0140997 A1 | 6/2009 | Jeong et al. | |
| 2010/0175028 A1* | 7/2010 | Nozaki ......................... | 715/830 |
| 2010/0295805 A1 | 11/2010 | Shin et al. | |
| 2010/0315438 A1 | 12/2010 | Horodezky et al. | |

(Continued)

FOREIGN PATENT DOCUMENTS

| | | |
|---|---|---|
| JP | 2000-267783 | 9/2000 |
| JP | 2011-505641 | 2/2011 |

(Continued)

OTHER PUBLICATIONS

Notice of Reason for Refusal issued by JPO for appl. No. JP2012-099262, mailed May 28, 2014, 4 pgs.

(Continued)

*Primary Examiner* — Pegeman Karimi
(74) *Attorney, Agent, or Firm* — Squire Patton Boggs (US) LLP

(57) ABSTRACT

Disclosed is an information processing apparatus including: a display unit to display a window; a touch panel unit to detect a touch operation which is performed for the display unit; and a control unit, wherein when the touch panel unit receives a flick operation in a first direction for a portion other than a predetermined position in a predetermined scroll area displayed on the display unit, the control unit instructs the display unit to scroll the window displayed in the scroll area in the first direction, and when the touch panel unit receives the flick operation in the first direction for the predetermined position in the scroll area, the control unit executes a function which is previously related to the first direction.

25 Claims, 8 Drawing Sheets

(56) References Cited

U.S. PATENT DOCUMENTS

| | | | |
|---|---|---|---|
| 2011/0193804 A1 | 8/2011 | Shin et al. | |
| 2013/0021287 A1 | 1/2013 | Endo et al. | |

FOREIGN PATENT DOCUMENTS

| | | |
|---|---|---|
| JP | 2011-165192 | 8/2011 |
| JP | 2011-209824 | 10/2011 |
| JP | 2012-048525 | 3/2012 |
| JP | 2012-527685 | 11/2012 |
| JP | 2012-530291 | 11/2012 |
| WO | WO 2010/134729 | 11/2010 |
| WO | WO 2010144726 | 12/2010 |

OTHER PUBLICATIONS

Translation of the Notice of Reason for Refusal issued by JPO for appl. No. JP2012-099262, mailed May 28, 2014, 8 pgs.

Notice of Reason for Refusal issued by JPO for appl. No. JP2012-099262, mailed Feb. 17, 2015, 3 pgs.

Translation of the Notice of Reason for Refusal issued by JPO for appl. No. JP2012-099262, mailed Feb. 17, 2015, 7 pgs.

\* cited by examiner

FIG.8

|  | ITEM IN SELECTED CONDITION | ITEM IN UNSELECTED CONDITION | AREA OTHER THAN ITEM |
|---|---|---|---|
| FLICK OPERATION IN SAME DIRECTION AS SCROLLING | EXECUTE FUNCTION | SCROLL | SCROLL |
| FLICK OPERATION IN DIFFERENT DIRECTION FROM SCROLLING | EXECUTE FUNCTION | INVALIDATE OR EXECUTE FUNCTION | INVALIDATE |

INFORMATION PROCESSING APPARATUS, INFORMATION PROCESSING METHOD AND TANGIBLE COMPUTER-READABLE RECORDING MEDIUM

BACKGROUND OF THE INVENTION

1. Field of the Invention

The present invention relates to an information processing apparatus, an information processing method and a tangible computer-readable recording medium which perform different operations based on positions where a flick operation is performed.

2. Description of Related Art

In recent years, information processing apparatuses like smart phones having a touch panel become popular. In the touch panels, the operations can be received by various schemes, such as a drag operation and a flick operation, in addition to a select operation. A large number of technologies for executing a function related to an operation when the above operation is received, have been proposed.

For example, Japanese Patent Application Publication No. 2011-165192 discloses a technology relating to an information processing apparatus having a touch panel that can receive a flick operation. In the above technology, when the flick operation is performed for an item in a window displayed on the touch panel, the function related to the direction of the performed flick operation is executed.

In the technology disclosed in Japanese Patent Application Publication No. 2011-165192, it is assumed that when an item is arranged in a scrollable area in the window, the function is executed by performing a flick operation in a different direction from the scrolling direction. More specifically, in the window in which the list of the items arranged in the vertical direction can be scrolled in the upper direction and the lower direction, when a user performs the flick operation for the intended item in the right direction or the left direction, the function which is previously related to the direction of the flick operation is executed.

However, in case that the scrollable area is scrolled by the flick operation, if the direction of the flick operation for executing the function is consistent with the direction of the flick operation for scrolling the area, there is a problem that it cannot be determined whether the flick operation indicates the instruction for executing the function or the instruction for scrolling the area.

SUMMARY

To achieve at least one of the abovementioned objects, an information processing apparatus reflecting one aspect of the present invention comprises:

a display unit to display a window;

a touch panel unit to detect a touch operation which is performed for the display unit; and a control unit, wherein when the touch panel unit receives a flick operation in a first direction for a portion other than a predetermined position in a predetermined scroll area displayed on the display unit, the control unit instructs the display unit to scroll the window displayed in the scroll area in the first direction, and when the touch panel unit receives the flick operation in the first direction for the predetermined position in the scroll area, the control unit executes a function which is previously related to the first direction.

Preferably, the predetermined position is a position on the window displayed in the scroll area where an item is arranged.

Preferably, when the touch panel unit receives the flick operation in the first direction for the item, the control unit executes the function for the item, which is previously related to the first direction.

Preferably, the item is an item in a selected condition.

Preferably, the control unit enables a plurality of items to be the selected condition, and in case that the plurality of the items in the selected condition are present, when the touch panel unit receives the flick operation in the first direction for anyone of the items in the selected condition, the control unit executes the function for the plurality of items in the selected condition, which is previously related to the first direction.

Preferably, an operation of setting the item to be the selected condition is an operation other than the flick operation.

Preferably, the operation of setting the item to be in the selected condition is a double tap operation.

Preferably, the control unit instructs the display unit to display the item in the selected condition so as to distinguish an item in an unselected condition from the item in the selected condition.

Preferably, a function marking indicating a content of the function related to the first direction is provided in the first direction with respect to the item.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 8 is a table showing the relation between the direction of the flick operation and the operation of the information processing apparatus based on the position where the flick operation is performed.

DETAILED DESCRIPTION OF PREFERRED EMBODIMENT

Hereinafter, a preferred embodiment of the present invention will be explained with reference to the accompanying drawings.

Figure 1:
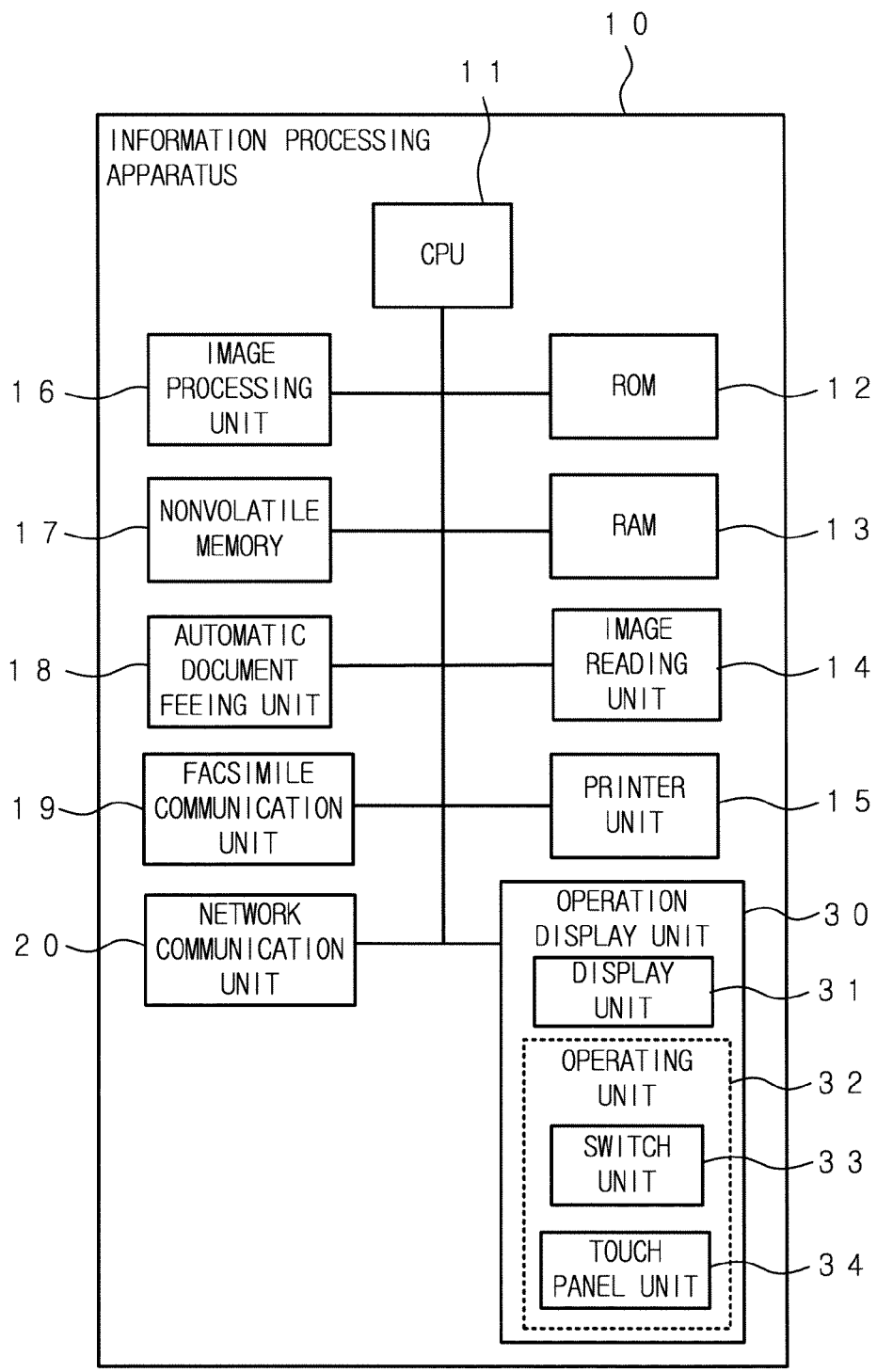
FIG. 1 is a block diagram illustrating a schematic structure of an information processing apparatus according to an embodiment.

FIG. 1 is a block diagram illustrating a schematic structure of an information processing apparatus 10 according to an embodiment. In this embodiment, the information processing apparatus 10 is configured as an image forming device having a scan function, a copy function, a print function, and a facsimile communication function, and the like.

The information processing apparatus 10 comprises a CPU (Central Processing Unit) 11 for comprehensively controlling the operation of the information processing apparatus 10. The CPU 11 are connected to a ROM (Read Only Memory) 12, a RAM (Random Access Memory) 13, an image reading unit 14, a printer unit 15, an image processing unit 16, a nonvolatile memory 17, an automatic document feeing unit 18, a facsimile communication unit 19, a network communication unit 20, and an operation display unit 30 via a bus.

By the CPU 11, a middleware, application programs and the like are executed on an OS (Operating System) program as a base. Moreover, the CPU 11 also has a function as a control unit that controls the display contents on the operation display unit 30.

In the ROM 12, various types of programs are stored. By executing the processes by the CPU 11 in accordance with these programs, each function of the image processing apparatus 10 is realized. Moreover, in the ROM 12, a program for causing the CPU 11 to control the above display contents, is stored.

The RAM 13 is used as a work memory for temporarily storing various data when the CPU 11 executes the process in accordance with the programs and as an image memory for storing image data.

The image reading unit 14 has the function for optically reading an original to obtain the image data. For example, the image reading unit 14 comprises a light source for irradiating the original with light, a line image sensor for reading the original line by line in the width direction of the original by receiving the reflected light from the original, a moving unit for sequentially moving the reading position line by line in the longitudinal direction of the original, an optical system having lenses, mirrors and the like for guiding the reflected light from the original to the line image sensor and focusing the reflected light on the line image sensor, a converting unit for converting an analog image signal outputted from the line image sensor into digital image data, and the like.

The printer unit 15 has the function for forming an image based on the image data, on the recording paper. In this embodiment, the printer unit 15 is configured as a so-called laser printer for forming an image by the electrophotographic process. The laser printer comprises a conveying device for the recording paper, a photoconductive drum, a charging device, a laser unit, a developing device, a transfer and separation device, a cleaning device and a fixing device. The image may be formed by another system.

The image processing unit 16 carries out the rasterization processing for converting print data into image data, compression/decompression processing of image data and the like, in addition to the processings, such as enlargement/reduction and rotation of the image.

The nonvolatile memory 17 is a memory (flash memory) in which the stored contents are not damaged even if the information processing apparatus 10 is turned off, and is used for storing various types of setting information and the like.

The automatic document feeing unit 18 has a function of sequentially feeding the original sheet by sheet from the top sheet of the original set on the document setting unit and for conveying the original to the predetermined discharge position via the reading position of the image reading unit 14.

The facsimile communication unit 19 has a function of transmitting and receiving the image data to/from an external device having the facsimile function via a public line.

The network communication unit 20 has a function of communicating the data with a terminal device or another external device via a network, such as a LAN (Local Area Network). In this embodiment, the information processing apparatus 10 transmits a mail through the network communication unit 20.

The operation display unit 30 comprises a display unit 31 and an operating unit 32. The operating unit 32 comprises a switch unit 33 having a start button and the like, and a touch panel unit 34. The display unit 31 is configured by a liquid crystal display (LCD) or the like, and has a function for displaying various types of operation windows, setting windows and the like.

The touch panel unit 34 is provided on the display screen of the display unit 31. The touch panel unit 34 detects the coordinate position at which the screen is pushed with a touch pen, the user's finger or the like. In this embodiment, the touch panel unit 34 is a touch panel of an electrostatic capacitance type. The CPU 11 determines the type of operation in which the user pushes the screen, in accordance with the change in the coordinates of the pushed position detected by the touch panel unit 34, the number of times of pushing operations within a predetermined area, and the pushing time, and the like.

The information processing apparatus 10 displays a plurality of items in a predetermined scroll area 43 (see FIG. 2) of the window displayed on the display unit 31. An item means an icon of a document file, an image file, or address data of a telephone book, and the like. In this embodiment, the case in which the item is an icon of a document file, is explained. Moreover, the information processing apparatus 10 receives a select operation for selecting an item displayed in the scroll area 43, an operation of executing a predetermined function for the item, and an operation of scrolling the window displayed in the scroll area 43, and the like. For example, when it is attempted to transmit a file via a mail, the information processing apparatus 10 receives the instructions of selecting a file, and of transmitting the selected file via a mail by the operations performed for the item of this file. At this time, items which are not displayed in the scroll area 43 can appear in the scroll area 43 by scrolling the window displayed in the scroll area 43, and then the select operation for the displayed item can be received from the user.

In this embodiment, the operations received by the information processing apparatus 10 from the user are three kinds of operations: a flick operation; a double tap operation; and a drag operation. The flick operation is one in which the screen is pushed on the predetermined coordinates of the touch panel unit 34 with the user's finger or the like and the pushed portion is flicked with the user's finger or the like in any of upper, lower, right and left directions. The user's finger ore the like is released from the touch panel unit 34 at the end of the flick operation. The double tap operation is one in which the screen is touched on the predetermined coordinates of the touch panel unit 34 twice within a short time, and corresponds to the double clicking in case of a mouse. The drag operation is one in which the screen is pushed on the predetermined coordinates of the touch panel unit 34 with the user's finger or the like, the user's finger or the like slowly moves in any of upper, lower, right or left directions in the situation in which the screen is pushed, and the user's finger or the like is released from the touch panel unit 34 after the finger or the like stops.

Hereinafter, the window displayed on the display unit 31 of the information processing apparatus 10 and the operation performed for the window by the user, will be explained.

Figure 2:
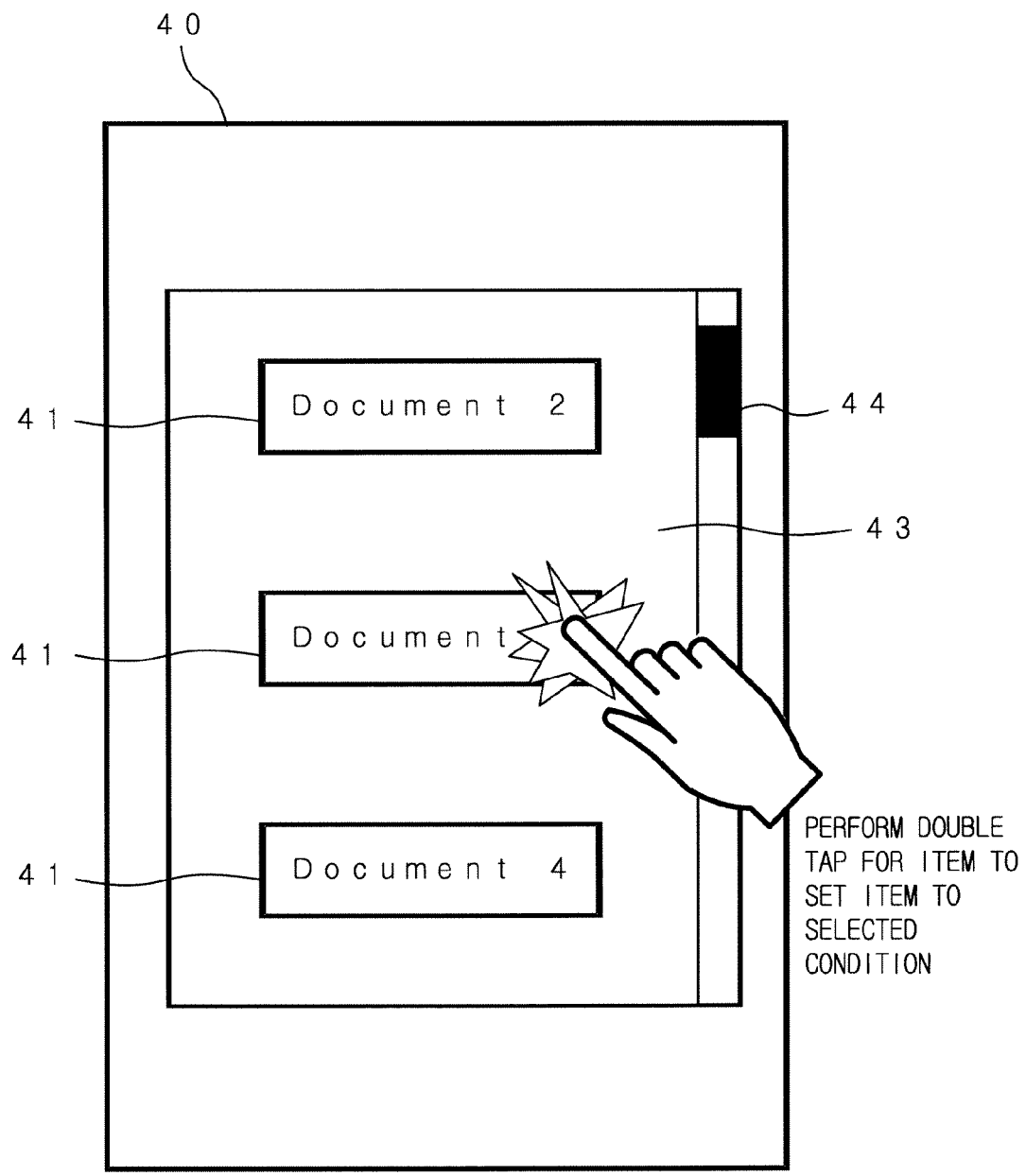
FIG. 2 is an explanatory view illustrating an example of the operation window displayed on a display unit.

FIG. 2 illustrates an operation window 40 which is an example of the window displayed on the display unit 31. On the operation window 40, three items (Document 2, Document 3, and Document 4) are displayed in the scroll area 43 at the center of the window. The item is displayed as an unselected item button 41 when the item is in an unselected condition. The item is displayed as a selected item button 41A (see FIG. 3) when the item is in a selected condition. When the user performs the flick operation in the upper direction or the lower direction for a portion other than the predetermined position in the scroll area 43, or when the user moves a scroll bar 44 arranged at the right end of the scroll area 43 in the upper direction or the lower direction by the drag operation, the window displayed in the scroll area 43 is scrolled in the upper direction or the lower direction, and other items which are not currently displayed appear.

Figure 3:
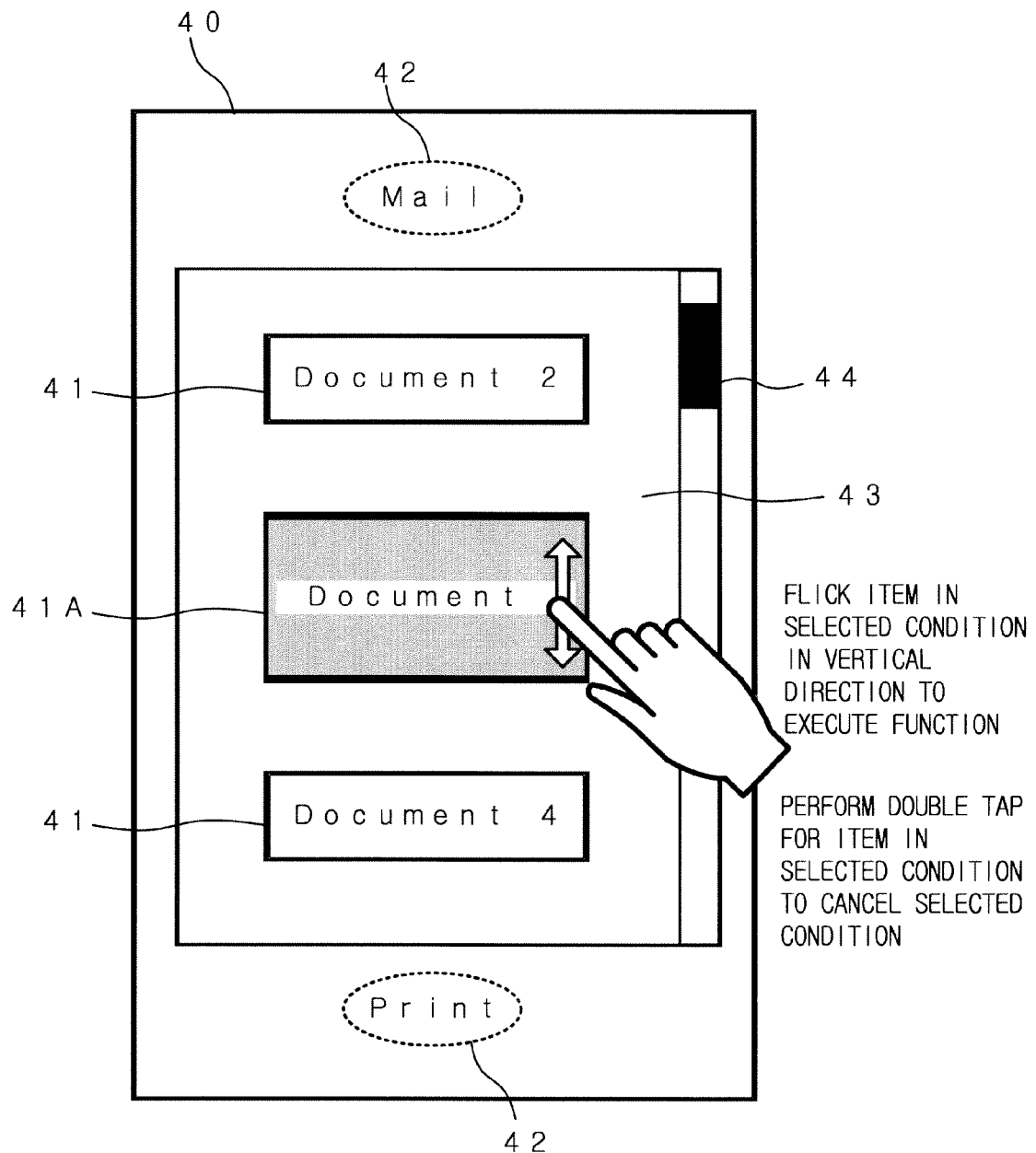
FIG. 3 is an explanatory view illustrating an example operation window in case that an item in a selected condition is present.

Moreover, when the user performs the double tap operation for an item in an unselected condition (unselected item button 41), the condition of the above item is changed from the unselected condition to the selected condition (selected item button 41A) (see FIG. 3).

FIG. 3 illustrates the operation window 40 in case that Document 3 displayed in the operation window 40 of FIG. 2 is in the selected condition. The item in the selected condition (selected item button 41A) is displayed in a different display form from that of the item in the unselected condition (unselected item button 41). In this embodiment, the selected item button 41A is displayed with a gray color so as to have the larger size than the unselected item button 41.

When the user performs the double tap operation for the selected item button 41A, the selection of the above item is canceled, and the item returns to the unselected condition (returns to the unselected item button 41). In case of FIG. 3, when the double tap operation is performed for the selected item button 41A corresponding to Document 3, the selected item button 41A returns to the unselected item button 41 shown in FIG. 2.

Figure 4:
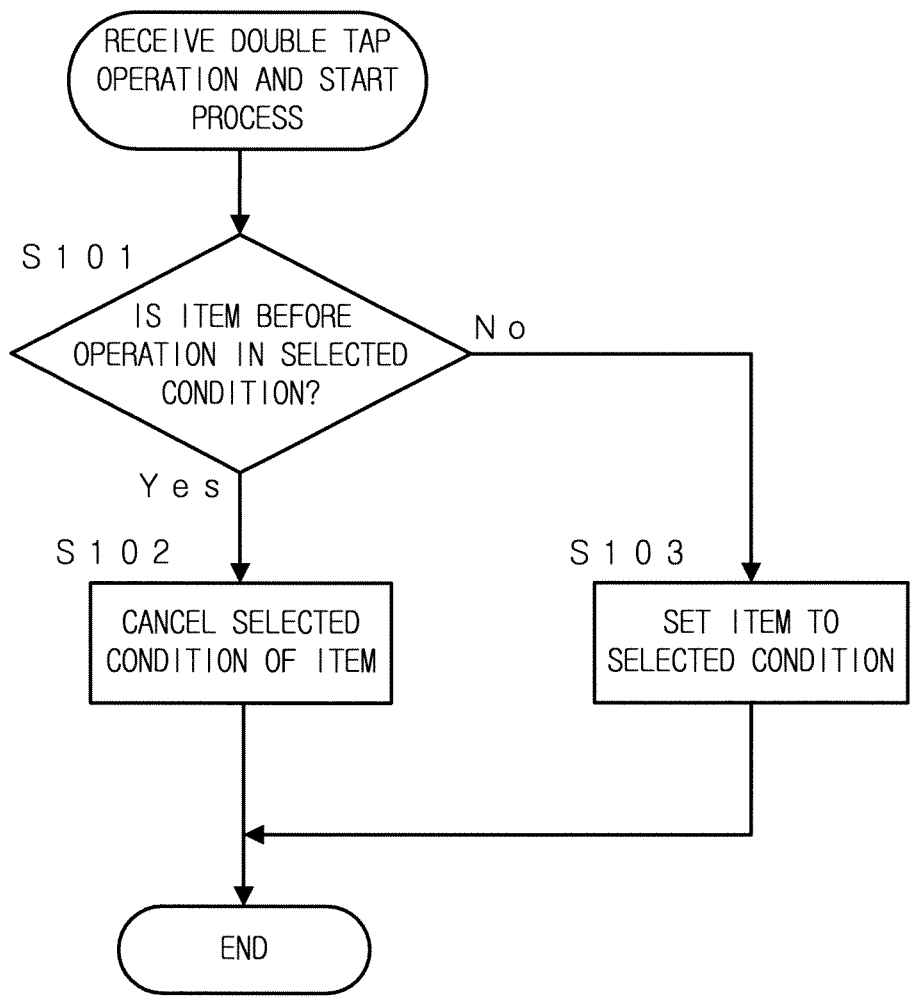
FIG. 4 is a flowchart illustrating a flow of the process of changing the condition of the item between the selected condition and the unselected condition.

With reference to FIG. 4, the process executed by the information processing apparatus 10 when the condition of the item is changed between the selected condition and the unselected condition, will be explained.

First, when the double tap operation performed by the user is received for a displayed item, it is determined whether this item is in the selected condition or not (Step S101). When the item is in the unselected condition (unselected item button 41) (Step S101; NO), this item is changed to the selected condition (selected item button 41A) (Step S103), and the process is ended.

Conversely, when the item for which the double tap operation is received is in the selected condition (selected item button 41A) (Step S101; YES), the selected condition of this item is cancelled (Step S102), and the process is ended.

Returning to FIG. 3, when the user performs the flick operation in the upper direction or the lower direction for the selected item button 41A, the information processing apparatus 10 executes a function related to the direction in which the flick operation is performed, without scrolling the window in the scroll area 43. The content of the function executed in this step is displayed as a function marking 42 above or below the scroll area 43 in the operation window 40. The function marking 42 is displayed only when there is an item in the selected condition, and is not displayed normally. In case that there is no item in the selected condition, when the user performs the double tap operation for a predetermined item, the function marking 42 appears in connection with the change in the display form of the above predetermined item.

The user checks the content of the function to be executed from the function marking 42, and performs the flick operation in the direction of the function marking 42 indicating a desired function content. Accordingly, the information processing apparatus 10 executes the function for the selected item button 41A for which the flick operation is received.

More specifically, in case of FIG. 3, in the upper function marking 42, the indication "Mail" is displayed and in the lower function marking 42, the indication "Print" is displayed. When the user performs the flick operation in the upper direction for the selected item button 41A (in this embodiment, for Document 3), the Document 3 is transmitted via a mail. When the user performs the flick operation in the lower direction for the Document 3, the Document 3 is printed. In this case, the transmission destination of the mail and the printer setting and the like, are set in advance. The above information (the transmission destination of the mail, the printer setting, and the like) may be set for each item in advance.

Figure 5:
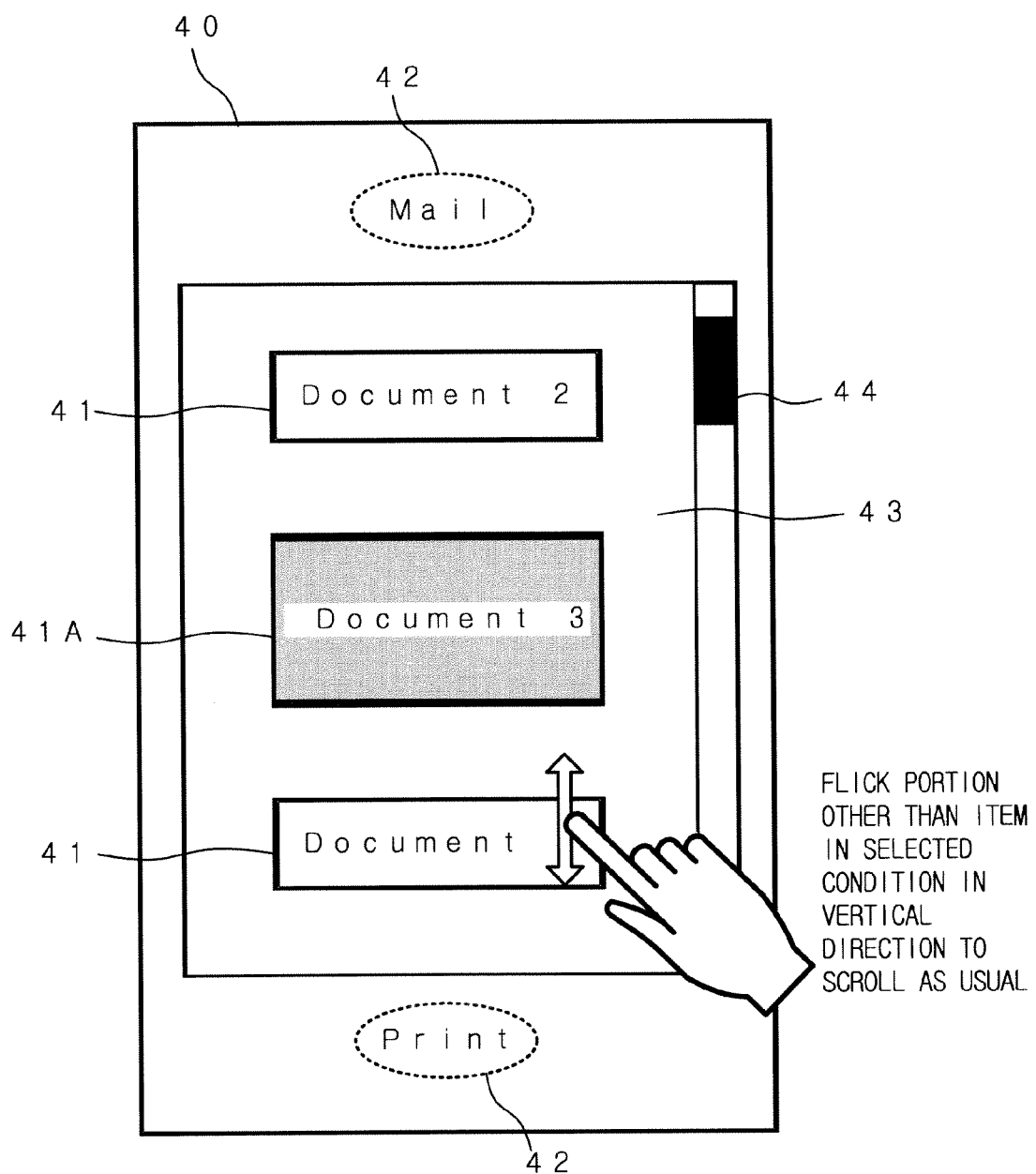
FIG. 5 is an explanatory view illustrating the situation in which the flick operation is performed for a portion other than an item in the selected condition when the item in the selected condition is present.

FIG. 5 illustrates the situation in which the flick operation is performed in the upper direction or the lower direction for an area other than the selected item button 41A when the selected item button 41A is present. In the scroll area 43, when the flick operation performed in the upper direction or the lower direction is received for an area other than the selected item button 41A, the function is not executed since the above flick operation is not the flick operation performed for the selected item button 41A. Then, the window in the scroll area 43 is scrolled in the direction of the flick operation. An area (portion) other than the selected item button 41A means an item in the unselected condition (unselected item button 41) or a blank space within the scroll area 43.

Figure 6:
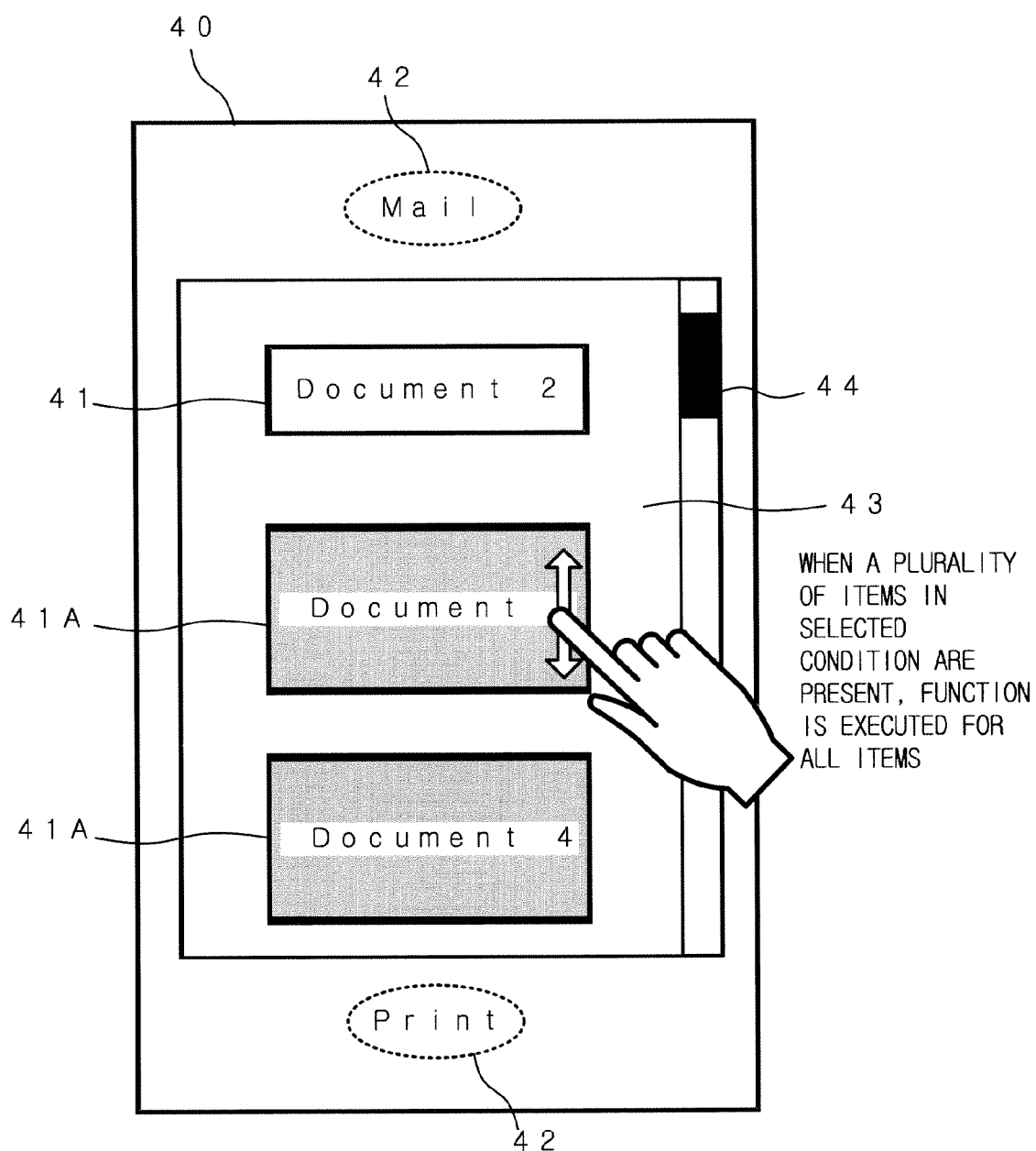
FIG. 6 is an explanatory view illustrating an example case in which a plurality of items in a selected condition are present.

FIG. 6 illustrates an example case in which a plurality of items are set to the selected condition. In this drawing, the operation window 40 displayed by performing the double tap operation for Document 4 in the operation window 40 of FIG. 3, is shown. According to the operation window 40 illustrated in FIG. 6, since the Document 4 is changed to the selected condition in the situation in which the Document 3 is already in the selected condition, the two items that are the Document 3 and the Document 4 are displayed as the selected item buttons 41A.

In case of FIG. 6, when the user performs the flick operation in the upper direction or the lower direction for one the selected item button 41A between the Document 3 and the Document 4, the function related to the direction of the flick operation is executed for all items in the selected condition.

More specifically, in case of FIG. 6, when the user performs the flick operation for the selected item button 41A of the Document 3 in the upper direction, both Document 3 and Document 4 are transmitted via a mail. When the user performs the flick operation for the selected item button 41A of the Document 3 in the lower direction, both Document 3 and Document 4 are printed. In this case, the transmission destination of the mail and the printer setting and the like, are set in advance. The different transmission destinations for the respective items and the setting information therefor may be set. The same function is executed when the flick operation is performed for the selected item button 41A of the Document 4.

A plurality of items in the selected condition in this embodiment are not limited to the items displayed simultaneously in the operation window 40. For example, both of an item currently displayed in the window in the scroll area 43 and an item to be displayed when the window in the scroll area 43 is scrolled, can be set to the selected condition. Then, the user can instruct the information processing apparatus 10 to execute a function for all items in the selected condition by one flick operation.

More specifically, for example, in case that the user sets both of the Document 3 and Document 9 to be displayed by scrolling the window in the scroll area 43 are set to the selected condition in FIG. 3, when the user performs the flick operation in the upper direction for either one of the Document 3 and the Document 9, the information processing apparatus 10 transmits both Document 3 and Document 9 in the selected condition via a mail.

Figure 7:
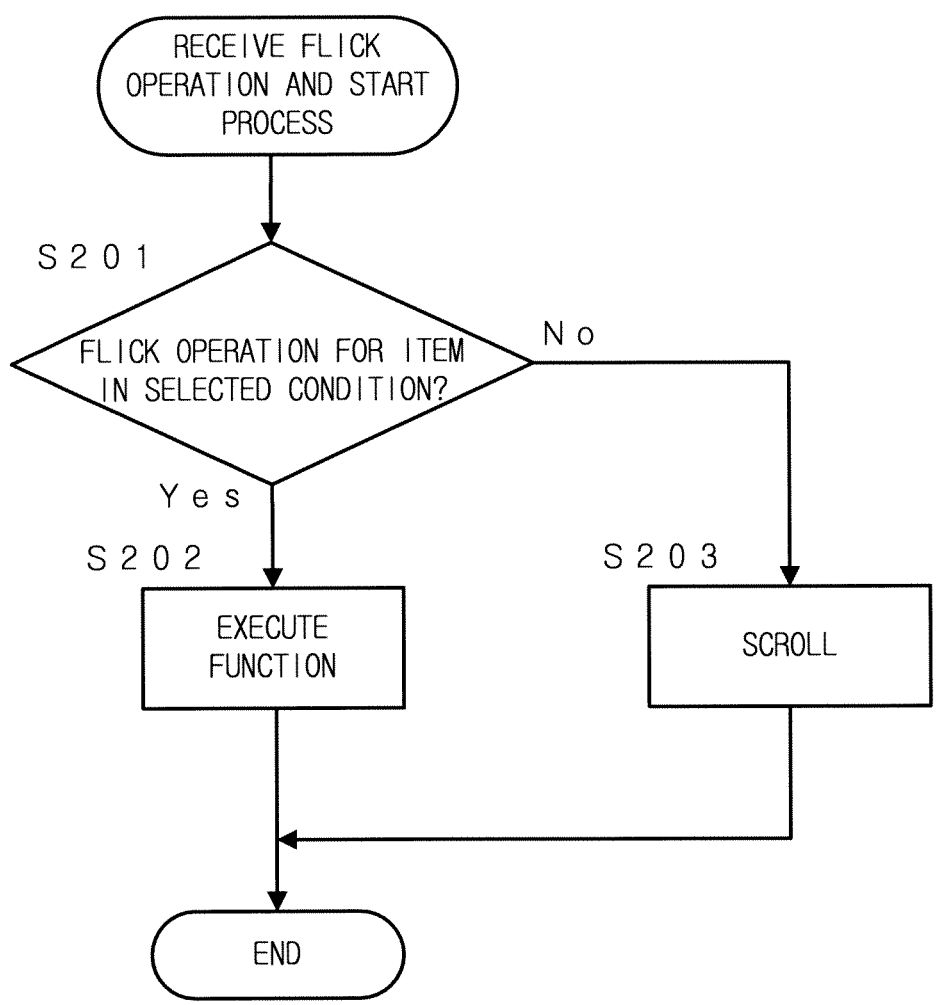
FIG. 7 is a flowchart illustrating a flow of the process which is executed when a flick operation is received.

FIG. 7 is a flowchart illustrating a flow of the process which is executed when the information processing apparatus 10 receives the flick operation. In this embodiment, the direction of the received flick operation is consistent with the direction of the flick operation for scrolling the window in the scroll area 43.

First, when the information processing apparatus 10 receives the flick operation, the CPU 11 determines whether the flick operation is performed for an item in the selected condition (Step S201). When the received flick operation is the flick operation performed for the item in the selected condition (selected item button 41A) (Step S201; YES), a function related to the direction of the received flick operation is executed (Step S202), and the process is ended. In this embodiment, when there are a plurality of items in the selected condition, the above function is executed for all of the items in the selected condition.

When the received flick operation is the flick operation performed for a portion other than the item in the selected condition (selected item button 41A) (Step S201; NO), the window in the scroll area 43 is scrolled in the direction of the received flick operation (Step S203), and the process is ended. In case that the flick operation is performed without the item in the selected condition, the window in the scroll area 43 is scrolled in the direction of the flick operation when the position where the flick operation is performed is within the scroll area 43 even though the item is arranged on the above position.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In the above embodiment, the condition of the item is changed between the unselected condition and the selected condition by the double tap operation. However, the condition may be changed by other kinds of operations. In the above embodiment, the types of the operations performed by the user are three types of operations which are the flick operation, the drag operation and the double tap operation. However, the type of operation is not limited to those. For example, a select operation, and other operations, such as a pinch-out or pinch-in, may be performed.

According to the above embodiment, the information processing apparatus 10 is explained as an example. However, the present invention may be realized by a program for causing the information processing apparatus 10 to operate as explained in the embodiment. Moreover, the information processing apparatus 10 is not limited to the image forming device. The information processing apparatus may be a touch panel comprising the CPU 11, the ROM 12, the RAM 13, and the nonvolatile memory 17.

According to the above embodiment, when the flick operation is performed for an item in the selected operation in the same direction as that of the flick operation for scrolling the window, a function related to the direction of the flick operation is executed. However, when the flick operation is performed for an item in the unselected condition, the function may be executed. The information processing apparatus determines the execution of the function or the scroll of the window depending on whether the flick operation is performed for an item or for an area other than the item. When the flick operation is performed for an item in the selected condition in the same direction as that of the flick operation for scrolling the window, in case that the function related to the direction of the flick operation is executed, the function can be collectively executed for a plurality of items by one flick operation in the situation in which a plurality of items are set to the selected condition.

According to the above embodiment, the scrolling direction of the window is only the upper direction or the lower direction. However, the scrolling direction is not limited to the above direction. The window may be scrolled in the horizontal direction or scrolled in an oblique direction.

According to the above embodiment, the direction (vertical direction) of the flick operation for executing the function and the direction (vertical direction) of the flick operation for scrolling the window are consistent. However, the function may be executed by performing the flick operation in another direction which is different from the direction of the flick operation for scrolling the window. For example, in case that the directions of the flick operation for scrolling the window are two directions which are the upper direction and the lower direction, the directions of the flick operation for executing the functions may be four directions which are the upper direction, the lower direction, the right direction and the left direction.

FIG. 8 illustrates the table showing the relation between the direction of the flick operation and the operation of the information processing apparatus 10 based on the position where the flick operation is performed in the above case.

When the flick operation is performed for an item in the selected condition in the same direction as that of the flick operation for scrolling the window, the function related to the above direction is executed.

When the flick operation is performed for an item in the unselected condition in the same direction as that of the flick operation for scrolling the window, the window is scrolled in the above direction.

When the flick operation is performed for an area other than the item displayed in the window in the same direction as that of the flick operation for scrolling the window, the window is scrolled in the above direction.

When the flick operation is performed for an item in the selected condition in a different direction from that of the flick operation for scrolling the window, the function related to the different direction is executed.

When the flick operation is performed for an item in the unselected condition in a different direction from that of the flick operation for scrolling the window, the function related to the different direction is executed or the performed flick operation is invalidated. The execution of the function or the invalidation of the operation can be set in advance by an administrator appropriately.

When the flick operation is performed for an area other than the item displayed in the window in a different direction from that of the flick operation for scrolling the window, the performed flick operation is invalidated.

In case that the item in the selected condition is present, the function may be executed by performing the flick operation in a direction other than the direction of the flick operation for scrolling the window even though the flick operation is performed for a portion other than an item in the selected condition. In case that the flick operation for executing the function is performed in the same direction as that of the flick operation for scrolling the window, the information processing apparatus may determine the flick operation for executing the function or the flick operation for scrolling the window depending on whether the received flick operation is the flick operation performed for the item or not.

In case that the flick operation is performed for an item in the selected condition in the same direction as that of the flick operation for scrolling the window, when there is no function related to the direction of the performed flick operation, the flick operation may be invalidated, or the window may be scrolled. Similarly, in case that the function related to the direction of the performed flick operation cannot be executed, the flick operation may be invalidated, or the window may be scrolled.

In the above embodiment, the touch panel unit 34 is a touch panel of the electrostatic capacitance type. However, other types of touch panels may be used.

The function assigned to each direction of the flick operation can be changed by the user. For example, in case of FIG. 3, the flick operation performed in the upper direction is the mail transmission. However, other functions, such as printing, facsimile transmission, and copying of a file, may be assigned instead of the mail transmission.

According to the above embodiment, the function marking 42 is displayed only when an item in the selected condition is present. However, the function marking 42 may be always displayed. Moreover, no function marking 42 may be displayed at all. The user can check the content of the function to be executed, according to the direction of the flick operation.

The function marking 42 is not necessarily required to be provided in the window displayed on the display unit 31. For example, the function marking may be provided in a frame around the display unit 31.

In the above embodiment, when the flick operation is performed for an item, the function related to the direction of the performed flick operation is executed for the item. However, the function to be executed is not required to be executed for the item. For example, when the flick operation is performed for an item in the lower direction, the image forming device may be powered off or may be set to a power saving mode.

One of the objects of the above embodiment is to provide an information processing apparatus, an information processing method and a tangible computer-readable recording medium which can determine the execution of the function or the scroll of the window even though the direction of the flick operation for scrolling the window is the same as that of the flick operation for executing the function, and which can truly realize the operation requested by the user.

In the above embodiment, even though the direction of the flick operation for scrolling the window is consistent with the direction of the flick operation for executing the function, the information processing apparatus determines the execution of the function or the scroll of the window depending on whether the received flick operation is performed for a predetermined position in a predetermined scroll area displayed on the display unit. When the flick operation is performed in the first direction for a portion other than the predetermined position, the window displayed in the scroll area is scrolled in the first direction, and when the flick operation is performed in the first direction for the predetermined position, the function which is previously related to the first direction is executed.

In the above embodiment, when the direction of the flick operation for scrolling the window is consistent with the direction of the flick operation for executing the function, the information processing apparatus determines the execution of the function or the scroll of the window in the scroll area displayed on the display unit depending on whether the flick operation is performed for an item on the window in the scroll area displayed on the display unit, or not.

In the above embodiment, when an operation is performed for the item, the function related to the direction of the performed flick operation is executed for the item. When the operation is performed for a portion other than the item, the window is scrolled in the scroll area displayed on the display unit.

In the above embodiment, a plurality of items can be set to the selected condition. In case that there are a plurality of items in the selected condition, when the flick operation for executing the function is performed for anyone of the items in the selected condition, the function related to the direction of the performed flick operation is executed for all items in the selected condition. Accordingly, the function can be executed for a plurality of items by one instruction.

In the above embodiment, the item in the selected condition is displayed so as to distinguish an item in the unselected condition from the item in the selected condition. These items are displayed in different forms, such as the difference in size, the gray indication, and the flashing, or the like.

In the above embodiment, the user can check the content of the function related to the direction of the flick operation. The content of the related function is displayed as a function marking in the same direction as that of the flick operation for executing the function with respect to the item. The function marking may be provided on the window displayed on the display unit or around the display unit.

According to the information processing apparatus, the information processing method and the tangible computer-readable recording medium, even though the direction of the flick operation for scrolling the window is consistent with the direction of the flick operation for executing the function, it is determined whether to execute the function or to scroll the window. Therefore, the operation requested by a user can be more truly realized.

The present U.S. patent application claims the priority of Japanese Patent Application No. 2012-99262, filed on Apr. 24, 2012, according to the Paris Convention, and the above Japanese Patent Application is the basis for correcting mistranslation of the present U.S. patent application.

What is claimed is:

1. An information processing apparatus comprising:
a display unit;
a touch panel unit to detect a touch operation which is performed for the display unit; and
a control unit,
wherein when the touch panel unit receives a flick operation in a first direction for a portion other than a predetermined position in a predetermined scroll area displayed on the display unit, the control unit instructs the display unit to scroll in the predetermined scroll area displayed on the display unit, and
when the touch panel unit receives a flick operation for the predetermined position in the predetermined scroll area displayed on the display unit and the control unit determines a direction of the received flick operation for the predetermined position in the predetermined scroll area is in the first direction, the control unit executes a function which is previously related to the first direction and which is other than scrolling function on the display unit.

2. The information processing apparatus of claim 1, wherein the predetermined position is a position where an item is arranged.

3. The information processing apparatus of claim 2, wherein when the touch panel unit receives the flick operation determined by the control unit to be in the first direction for the item, the control unit executes the function for the item, which is previously related to the first direction.

4. The information processing apparatus of claim 2, wherein the item is an item in a selected condition.

5. The information processing apparatus of claim 4, wherein
the control unit enables a plurality of items to be the selected condition, and
in case that the plurality of items in the selected condition are present, when the touch panel unit receives the flick operation determined by the control unit to be in the first direction for any one of the items in the selected condition, the control unit executes the function for the plurality of items in the selected condition, which is previously related to the first direction.

6. The information processing apparatus of claim 4, wherein an operation of setting the item to be the selected condition is an operation other than the flick operation.

7. The information processing apparatus of claim 4, wherein the operation of setting the item to be in the selected condition is a double tap operation.

8. The information processing apparatus of claim 4, wherein the control unit instructs the display unit to display the item in the selected condition so as to distinguish an item in an unselected condition from the item in the selected condition.

9. The information processing apparatus of claim 1, wherein a function marking indicating a content of the function related to the first direction is provided in the first direction with respect to the item.

10. The information processing apparatus of claim 1, wherein the touch panel unit receives a predetermined operation for switching an item, which is arranged in the predetermined scroll area displayed on the display unit, to a selected condition,
when the touch panel unit receives the flick operation in the first direction for the portion other than the position at which the item is arranged in the predetermined scroll area displayed on the display unit, the control unit instructs the display unit to scroll in the predetermined scroll area displayed on the display unit, and
when the touch panel unit receives the flick operation determined by the control unit to be in the first direction for the position at which the item is arranged in the scroll area, the control unit judges whether the item is in the selected condition, and in case that the item is in the selected condition, the control unit executes the function which is previously related to the first direction and which is other than scrolling function on the display unit.

11. The information processing apparatus of claim 10, wherein when the touch panel unit receives the flick operation in the first direction for the position at which the item which is not in the selected condition is arranged, the control unit does not execute the function which is related to the first direction.

12. The information processing apparatus of claim 1, wherein the touch panel unit receives a predetermined operation for switching an item, which is arranged in the predetermined scroll area displayed on the display unit, to a selected condition,
when the touch panel unit receives the flick operation in the first direction for the portion other than the position at which the item is arranged in the predetermined scroll area displayed on the display unit, the control unit instructs the display unit to scroll in the predetermined scroll area displayed on the display unit, and
in case that the touch panel unit receives the predetermined operation for switching the item to the selected condition before the flick operation is received in the first direction for the position at which the item is arranged in the scroll area, when the touch panel unit receives the flick operation in the first direction for the position at which the item is arranged, the control unit executes the function which is previously related to the first direction and which is other than scrolling function on the display unit.

13. The information processing apparatus of claim 1, wherein the touch panel unit receives a predetermined operation for switching an item, which is arranged in the predetermined scroll area displayed on the display unit, to a selected condition,
when the touch panel unit receives the flick operation in the first direction for the portion other than the position at which the item is arranged in the predetermined scroll area displayed on the display unit, the control unit instructs the display unit to scroll in the predetermined scroll area displayed on the display unit,
when the touch panel unit receives the flick operation in the first direction for the position at which the item which is in the selected condition is arranged in the scroll area, the control unit executes the function which is previously related to the first direction and which is other than scrolling function on the display unit, and
when the touch panel unit receives a flick operation in a second direction which is different from the first direction for the position at which the item which is not in the selected condition is arranged, the control unit executes a function which is related to the second direction for the item which is in the selected condition, or invalidates the flick operation in the second direction.

14. The information processing apparatus of claim 1, wherein the touch panel unit receives a flick operation in a second direction, which is different from the first direction in which the in the predetermined scroll area is scrolled, for the portion other than the predetermined position in the predetermined scroll area displayed on the display unit, the control unit invalidates the flick operation in the second direction, and
when the touch panel unit receives the flick operation in the first direction for the predetermined position in the scroll area, the control unit executes the function which is previously related to the first direction and which is different from the function for scrolling the window.

15. A tangible computer-readable recording medium storing a program therein, wherein the program causes an information processing apparatus comprising a display unit, and a touch panel unit to detect a touch operation which is performed for the display unit, to perform:
scrolling in a predetermined scroll area displayed on the display unit, when the touch panel unit receives a flick operation in a first direction for a portion other than a predetermined position in the predetermined scroll area displayed on the display unit; and
executing a function which is previously related to the first direction and which is other than scrolling function on the display unit, when the touch panel unit receives a flick operation for the predetermined position in the predetermined scroll area displayed on the display unit and a direction of the received flick operation for the predetermined position in the predetermined scroll area is determined to be in the first direction.

16. The tangible computer-readable recording medium of claim 15, wherein the predetermined position is a position where an item is arranged.

17. The tangible computer-readable recording medium of claim 16, wherein when the touch panel unit receives the flick operation determined to be in the first direction for the item, the program causes the information processing apparatus to execute the function for the item, which is previously related to the first direction.

18. The tangible computer-readable recording medium of claim 16, wherein the item is an item in a selected condition.

19. The tangible computer-readable recording medium of claim 18, wherein
the program causes the information processing apparatus to enable a plurality of items to be the selected condition, and
in case that the plurality of items in the selected condition are present, when the touch panel unit receives the flick operation determined to be in the first direction for any one of the items in the selected condition, the program causes the information processing apparatus to execute the function for the plurality of items in the selected condition, which is previously related to the first direction.

20. The tangible computer-readable recording medium of claim 18, wherein an operation of setting the item to be the selected condition is an operation other than the flick operation.

21. The tangible computer-readable recording medium of claim 20, wherein the operation of setting the item to be in the selected condition is a double tap operation.

22. The tangible computer-readable recording medium of claim 18, wherein the program causes the information processing apparatus to display the item in the selected condition on the display unit so as to distinguish an item in an unselected condition from the item in the selected condition.

23. The tangible computer-readable recording medium of claim 15, wherein the program causes the information processing apparatus to provide a function marking indicating a content of the function related to the first direction, in the first direction with respect to the item.

24. An information processing method comprising:
scrolling in a predetermined scroll area displayed on a display unit, when a touch panel unit receives a flick operation in a first direction for a portion other than a predetermined position in the predetermined scroll area; and
executing a function which is previously related to the first direction and which is other than scrolling function on the display unit, when the touch panel unit receives a flick operation for the predetermined position in the predetermined scroll area displayed on the display unit and a direction of the received flick operation for the predetermined position in the predetermined scroll area is determined to be in the first direction.

25. The information processing method of claim 24, wherein the predetermined position is a position where an item is displayed.

* * * * *